United States Patent
Price et al.

(10) Patent No.: US 11,027,253 B2
(45) Date of Patent: Jun. 8, 2021

(54) SYSTEMS AND METHODS FOR REDUCING HEAT EXCHANGER FOULING RATE

(71) Applicant: Chevron Phillips Chemical Company LP, The Woodlands, TX (US)

(72) Inventors: Ralph J. Price, Porter, TX (US); Jeffrey S. Lowell, Huffman, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 16/583,374

(22) Filed: Sep. 26, 2019

(65) Prior Publication Data
US 2021/0094009 A1  Apr. 1, 2021

(51) Int. Cl.
*B01J 8/18* (2006.01)
*C08F 2/00* (2006.01)
*B01J 8/00* (2006.01)

(52) U.S. Cl.
CPC .......... *B01J 8/1836* (2013.01); *B01J 8/0055* (2013.01); *B01J 8/1827* (2013.01); *C08F 2/007* (2013.01);
(Continued)

(58) Field of Classification Search
CPC ...... B01J 8/1836; B01J 8/0055; B01J 8/1827; B01J 2208/00168; B01J 2208/00761; C08F 2/007
(Continued)

(56) References Cited

U.S. PATENT DOCUMENTS 4,640,963 A   2/1987 Kreider
4,882,400 A   11/1989 Dumain
(Continued)

FOREIGN PATENT DOCUMENTS

WO   1997014721 A1   4/1997
WO   1997025355 A1   7/1997
WO   2018048472 A1   3/2018

OTHER PUBLICATIONS

IUPAC Compendium of Chemical Technology, 2nd Edition, 1997.
(Continued)

*Primary Examiner* — Huy Tram Nguyen
(74) *Attorney, Agent, or Firm* — Eversheds Sutherland (US) LLP

(57) ABSTRACT

Systems and methods of reducing heat exchanger fouling rate and of producing polyolefins are provide herein. In some aspects, the methods include providing a first gas stream comprising a gas and entrained fine polyolefin particles to a gas outlet line; preferentially removing a portion of the entrained fine polyolefin particles from the gas outlet line to form a bypass stream comprising a higher concentration of the entrained fine polyolefin particles than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

20 Claims, 7 Drawing Sheets
(2 of 7 Drawing Sheet(s) Filed in Color)

(52) U.S. Cl.
CPC ............. *B01J 2208/00168* (2013.01); *B01J 2208/00761* (2013.01)

(58) Field of Classification Search
USPC ..................................................... 422/138
See application file for complete search history.

(56) References Cited

U.S. PATENT DOCUMENTS

| | | |
|---|---|---|
| 5,026,795 A | 6/1991 | Hogan |
| 5,028,670 A | 7/1991 | Chinh et al. |
| 6,586,539 B2 | 7/2003 | Cassisa et al. |
| 7,332,070 B2 | 2/2008 | Nishida et al. |
| 7,718,139 B2 | 5/2010 | Scott |
| 7,977,436 B2 | 7/2011 | Scott |
| 8,198,384 B1 | 6/2012 | Moore |
| 10,457,753 B2 | 10/2019 | Lowell |
| 2006/0094837 A1 | 5/2006 | Dooley |
| 2007/0297954 A1* | 12/2007 | Santilli ............... H05H 1/48 422/186.04 |
| 2008/0045675 A1 | 2/2008 | Larson |
| 2009/0261486 A1 | 10/2009 | Olivier |
| 2012/0291738 A1* | 11/2012 | Hobart ............... F02N 19/10 123/142.5 R |
| 2015/0284481 A1 | 10/2015 | Cai et al. |
| 2018/0105613 A1 | 4/2018 | Lowell et al. |
| 2019/0382412 A1 | 12/2019 | Nicolaou |

OTHER PUBLICATIONS

International Search Report and Written Opinion issued in corresponding application No. PCT/US2020/051149, dated Feb. 5, 2021, 8 pages.

* cited by examiner

SYSTEMS AND METHODS FOR REDUCING HEAT EXCHANGER FOULING RATE

CROSS-REFERENCE TO RELATED APPLICATIONS

None.

TECHNICAL FIELD OF THE DISCLOSURE

This disclosure relates generally to systems and methods for reducing the rate heat exchanger fouling.

BACKGROUND

Gas-phase polyolefin reactor systems, such as fluidized bed reactor systems, are often configured to recycle at least a portion of the gases from the reactor. Specifically, gas-phase polyolefin reactor systems frequently separate solid polyolefin particles from an exiting gas stream, pass the separated gas stream through one or more heat exchangers to cool the separated gas stream, and recycle the cooled gas stream to the polyolefin reactor. However, over time, solid polyolefin particles tend to collect in the one or more heat exchangers. The collection of solid polyolefin particles fouls the one or more heat exchangers, and increases the pressure drop across the one or more heat exchangers, while also reducing the efficiency of the one or more heat exchangers. Once the pressure drop across the heat exchanger(s) exceeds a certain value, unit production rates are limited by this pressure drop, with higher pressure drops resulting in lower production rates. Due to the decrease in unit production caused by the heat exchanger fouling, the entire reactor system often has to be shut down, as often as once every 6 months for 7 or more days, to clean the heat exchangers and restore them to optimal efficiency, at a significant cost to the operator.

Accordingly, improved reactor systems and methods are needed.

SUMMARY

According to the present disclosure, systems and methods are provided having a structure that reduces this heat exchanger fouling problem. Therefore, this disclosure provides a method of reducing heat exchanger fouling rate comprising: providing a first gas stream comprising a gas and entrained fine polyolefin particles to a gas outlet line; preferentially removing a portion of the entrained fine polyolefin particles from the gas outlet line to form a bypass stream comprising a higher concentration of the entrained fine polyolefin particles than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

In accordance with a further aspect, this disclosure provides a system for reducing heat exchanger fouling rate comprising: a gas outlet line configured to pass a first gas stream comprising a gas and entrained fine polyolefin particles; a first heat exchanger configured to receive at least a portion of the first gas stream and produce a first cooled gas stream; and a bypass line configured to preferentially remove a portion of the entrained fine polyolefin particles from the gas outlet line to form a bypass stream comprising a higher concentration of the entrained fine polyolefin particles than is present in the first gas stream, the bypass line comprising a bypass line inlet and a bypass line outlet, wherein the bypass line inlet is located upstream of the first heat exchanger, wherein the bypass line outlet is located downstream of the first heat exchanger, and wherein a the bypass line is configured so that the bypass stream is combined with a second gas stream at the bypass line outlet to form a combined gas stream comprising one or more olefins or paraffins, and the temperature of the combined gas stream is below the dew point of the combined gas stream.

In accordance with a further aspect, this disclosure provides a method of polymerizing olefins comprising: contacting one or more olefins with a catalyst under polymerization conditions in a polymerization reactor to form a first gas stream comprising solid fines and unreacted olefins; providing the first gas stream to a gas outlet line; preferentially removing a portion of the solid fines from the gas outlet line to form a bypass stream comprising a higher concentration of the solid fines than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

In accordance with a further aspect, this disclosure provides a system for polymerizing olefins comprising: a polymerization reactor for contacting one or more olefins with a catalyst under polymerization conditions to form a first gas stream comprising solid fines and unreacted olefins; a gas outlet line configured to receive the first gas stream; a first heat exchanger configured to receive at least a portion of the first gas stream and produce a cooled gas stream; a bypass line configured to preferentially remove a portion of the solid fines from the gas outlet line to form a bypass stream comprising a higher concentration of the solid fines, the bypass line comprising an inlet and an outlet, wherein the inlet is located upstream of the first heat exchanger, wherein the outlet is located downstream of the first heat exchanger, and wherein the bypass line is configured so that the bypass stream is combined with a second gas stream at the bypass line outlet to form a combined gas stream comprising one or more olefins or paraffins, and the temperature of the combined gas stream is below the dew point of the combined gas stream.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following figures form part of the present specification and are included to further demonstrate certain aspects of the present disclosure. The invention may be better

Figure 1:
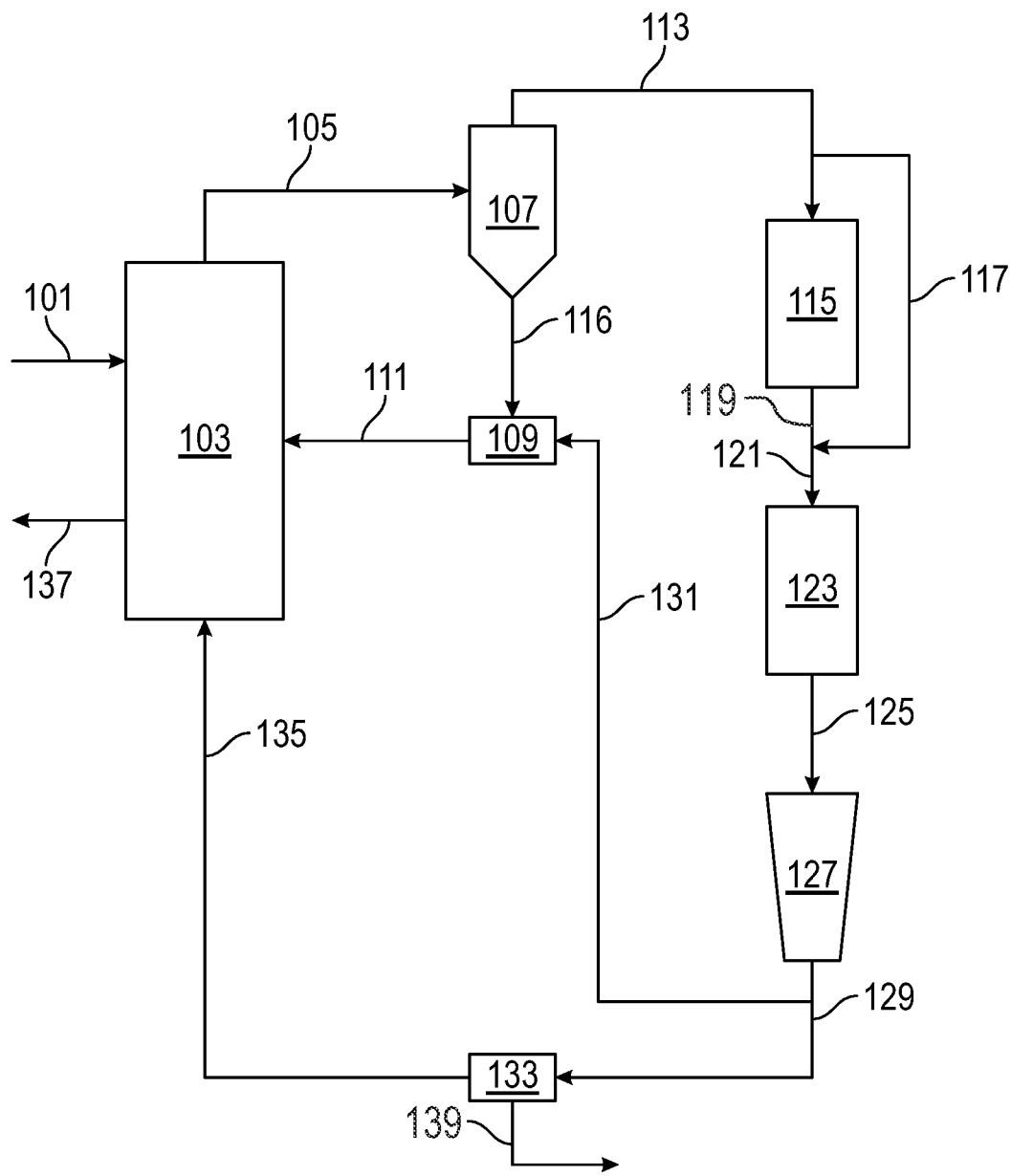
FIG. 1 illustrates a schematic of a system and method of polymerizing olefins according to an aspect of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs, and unless otherwise indicated or the context requires otherwise, these definitions are applicable throughout this disclosure. Further, unless otherwise required by context, singular terms shall include pluralities and plural terms shall include the singular.

If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Unless explicitly stated otherwise in defined circumstances, all percentages, parts, ratios, and like amounts used herein are defined by weight.

Further, in this connection, certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination.

Regarding claim transitional terms or phrases, the transitional term "comprising", which is synonymous with "including", "containing", or "characterized by" is inclusive or open-ended and does not exclude additional, un-recited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example, a method can comprise several recited steps (and other non-recited steps) but utilize a catalyst system preparation consisting of specific steps and utilize a catalyst system comprising recited components and other non-recited components. While compositions and methods are described in terms of "comprising" various components or steps, the compositions and methods can also "consist essentially of" or "consist of" the various components or steps.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

"Optional" or "optionally" means that the subsequently described event or circumstance can or cannot occur, and that the description includes instances where the event or circumstance occurs and instances where it does not.

The terms "configured for use" or "adapted for use" and similar language is used herein to reflect that the particular recited structure or procedure is used in an olefin polymerization system or process as disclosed herein. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

The term "fines", "solid fines", "fine polyolefin particles" and the like are used interchangeably herein to refer to solid polyolefin particles In one aspect, polyolefin fines can have an aerodynamic diameter of about or less than 250 µm (microns), 5 microns, 10 microns, 20 microns, 50 microns, 75 microns, or 200 mesh. Even though the term "polymer" may be associated with the term "fines", this term is intended to encompass any solid particle in the subject gaseous stream, including catalyst or pre-polymer particles that may be charged to the reactor, growing polymer particles, agglomerated polymer particles, and the flakes or spalling of polymer particles. In some embodiments, the polymer particle size in the process can include but is not limited to the following sizes; Group A, 30 to 100 microns; Group B, 100 to 1,000 microns; Group C, 0 to 30 microns. The polymer should not be construed to be limited to any particular particle size distribution.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" ($\alpha$-olefin) refers to an olefin that has a double bond between the first and second carbon atom of the longest contiguous chain of carbon atoms. The term "alpha olefin" includes linear and branched alpha olefins unless expressly stated otherwise.

When describing a range of measurements such as angles and the like, it is the Applicant's intent to disclose every individual number that such a range could reasonably encompass, for example, every individual number that has at least one more significant figure than in the disclosed end points of the range. As an example, when referring to an angle of between 60° and 70°, it is intended to disclose that the angle can be 60°, 61°, 62°, 63°, 64°, 65°, 66°, 67°, 68°, 69°, or 70°, including any subranges or combinations of subranges encompassed in this broader range. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicant reserves the right to proviso out or exclude any individual members of any such group, including any sub-ranges or combinations of sub-ranges within the group, or any selection, feature, range, element, or aspect that can be claimed, if for any reason Applicant chooses to claim less than the full measure of the disclosure, for example, to account for a reference that Applicant may be unaware of at the time of the filing of the application. In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about", the claims include equivalents to the quantities. The term "about" may mean within 10% of the reported numerical value, or within 5% of the reported numerical value, or within 2% of the reported numerical value.

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term "contacting", as used herein, refers to the process of bringing into contact at least two distinct species such that they can react. It will be appreciated, however, that the resulting reaction product can be produced directly from a reaction between the added reagents or from an intermediate from one or more of the added reagents which can be produced in the reaction mixture.

The terms "substantial" and "substantially", as used herein, are meant to be given their ordinary and customary meaning to a person of ordinary skill in the art (and are not to be limited to a special or customized meaning), including, without limitation, referring to a substantially perpendicular arrangement which differs from a perpendicular arrangement by up to ±10°.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, as explained above, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In one aspect of the present disclosure, a method of reducing heat exchanger fouling rate is provided comprising: providing a first gas stream comprising a gas and entrained fine polyolefin particles to a gas outlet line; preferentially removing a portion of the entrained fine polyolefin particles from the gas outlet line to form a bypass stream comprising a higher concentration of the entrained fine polyolefin particles than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

In another aspect of the present disclosure, a system for reducing heat exchanger fouling rate is provided comprising: a gas outlet line configured to pass a first gas stream comprising a gas and entrained fine polyolefin particles; a first heat exchanger configured to receive at least a portion of the first gas stream and produce a first cooled gas stream; and a bypass line configured to preferentially remove a portion of the entrained fine polyolefin particles from the gas outlet line to form a bypass stream comprising a higher concentration of the entrained fine polyolefin particles than is present in the first gas stream, the bypass line comprising a bypass line inlet and a bypass line outlet, wherein the bypass line inlet is located upstream of the first heat exchanger, wherein the bypass line outlet is located downstream of the first heat exchanger, and wherein a the bypass line is configured so that the bypass stream is combined with a second gas stream at the bypass line outlet to form a combined gas stream comprising one or more olefins or paraffins, and the temperature of the combined gas stream is below the dew point of the combined gas stream.

In another aspect of the present disclosure, a method of polymerizing olefins is provided comprising: contacting one or more olefins with a catalyst under polymerization conditions in a polymerization reactor to form a first gas stream comprising solid fines and unreacted olefins; providing the first gas stream to a gas outlet line; preferentially removing a portion of the solid fines from the gas outlet line to form a bypass stream comprising a higher concentration of the solid fines than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

According to another aspect of the present disclosure, a system for polymerizing olefins is provided comprising: a polymerization reactor for contacting one or more olefins with a catalyst under polymerization conditions to form a first gas stream comprising solid fines and unreacted olefins; a gas outlet line configured to receive the first gas stream; a first heat exchanger configured to receive at least a portion of the first gas stream and produce a cooled gas stream; a bypass line configured to preferentially remove a portion of the solid fines from the gas outlet line to form a bypass stream comprising a higher concentration of the solid fines, the bypass line comprising an inlet and an outlet, wherein the inlet is located upstream of the first heat exchanger, wherein the outlet is located downstream of the first heat exchanger, and wherein the bypass line is configured so that the bypass stream is combined with a second gas stream at the bypass line outlet to form a combined gas stream comprising one or more olefins or paraffins, and the temperature of the combined gas stream is below the dew point of the combined gas stream.

In some embodiments, the first gas stream comprises one or more of unreacted olefins, nitrogen, hydrogen, and one or more paraffins. For example, in some embodiments the first gas stream includes unreacted olefins such as ethylene, propylene, 1-butene, 2-butene, 1-hexene, or any combinations thereof. In some embodiments, the first gas stream includes paraffins such as ethane, propane, butane, pentane, iso-pentane, hexane, or any combinations thereof. In some embodiments, the fine polyolefin particles comprise homopolymers, copolymers, terpolymers, and the like. In some embodiments, the fine polyolefin particles comprise polyethylene. In some embodiments, the fine polyolefin particles comprise homopolymers of ethylene and copolymers of ethylene and at least one alpha-olefin wherein the ethylene content is at least about 50% by weight of the total monomers involved. Exemplary alpha-olefins that may be utilized are propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, 1,5-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of polyethylenes containing long chain branching may occur.

In some embodiments, the polyolefin particles are produced using a catalyst. In the present disclosure, any catalyst suitable for polymerizing olefins may be used. For example, an olefin polymerization catalyst may include at least one metal selected from Groups 3, 4, 5, 6, 7, 8, 9, 10, 11, 12 and 13 of the Periodic Table of the Elements. Exemplary metals are titanium, zirconium, hafnium, scandium, vanadium, iron, chromium, nickel and aluminum. The olefin polymerization catalyst may be neutral or cationic.

Examples of such polymerization catalysts include, but are not limited to:

[1] catalyst compounds and compositions containing a Group 6 element, such as chromium, examples of which include but are not limited to the chromium oxide-based catalysts and the organochromium catalysts which may be supported and/or activated;

[2] Ziegler-Natta catalysts and compositions of all types, which typically contain a transition metal component and a co-catalyst such as an organoaluminum compound;

[3] Metallocene catalysts of all types, which is used herein to refer to the substituted and unsubstituted transition metal mono(cyclopentadienyl) and bis(cyclopentadienyl) based catalysts, and analogs of such compounds, such as pentadienyl, pyrrole, boratabenzene, and the like, typically also including an organometallic co-catalyst such as an aluminoxane (such as methyl aluminoxane), alkyl or aryl aluminum compound, or alkyl or aryl substituted boron compound;

[4] Any catalyst compound containing a Group 13 element, such as aluminum containing compounds;

[5] Catalyst compounds and compositions containing a Group 10 element, for example, a nickel containing catalyst such as cationic nickel alkyl diimine complexes, often used in combination with an organometallic co-catalyst;

[6] Catalyst compounds and compositions containing a Group 8 element, such as iron containing compounds, which also optionally may include an organometallic co-catalyst such as an alkylaluminoxane or other organoaluminum or organoboron compound;

[7] Any compound containing a Group 4 element, such as titanium and zirconium containing compounds, examples of which include cationic or neutral titanium and zirconium compounds, and also which may include an organometallic co-catalyst such as an alkylaluminoxane or other organoaluminum or organoboron compound; and

[8] An olefin polymerization catalyst that polymerizes olefins to produce interpolymers of olefins having a molecular weight distribution (MWD) of from 1 to 2.5.

In some embodiments, the above catalysts can be supported on any variety of particulate carriers, as known in the art.

In some aspects, the fine polyolefin particles have an average diameter of less than about 200 µm, less than about 150 µm, less than about 100 µm, less than about 50 µm, less than about 10 µm, or any combinations of these ranges or any ranges therebetween. For example, in some aspects, the fine polyolefin particles have an average diameter of about 200 µm, about 195 µm, about 190 µm, about 180 µm, about 175 µm, about 170 µm, about 165 µm, about 160 µm, about 155 µm, about 145 µm, about 140 µm, about 135 µm, about 130 µm, about 125 µm, about 120 µm, about 115 µm, about 110 µm, about 105 µm, about 100 µm, about 95 µm, about 90 µm, about 85 µm, about 80 µm, about 75 µm, about 70 µm, about 65 µm, about 60 µm, about 55 µm, about 50 µm, about 45 µm, about 40 µm, about 35 µm, about 30 µm, about 25 µm, about 20 µm, about 15 µm, about 10 µm, about 9 µm, about 8 µm, about 7 µm, about 6 µm, about 5 µm, about 4 µm, about 3 µm, about 2 µm, about 1 µm, or any ranges therebetween.

In some aspects, the method further comprises providing the first cooled gas stream to a second heat exchanger, which produces a second cooled gas stream. In some aspects, the system further comprises a second heat exchanger downstream of the first heat exchanger, and wherein the second heat exchanger is configured to produce a second cooled gas stream. That is, in some aspects, the second heat exchanger is downstream of the first heat exchanger.

In some aspects, the bypass line outlet is located upstream of the second heat exchanger, and the second gas stream is the first cooled gas stream. That is, in some aspects, the bypass line is configured to bypass fine polyolefin particles around the first heat exchanger. In some aspects, the method further includes providing the second cooled gas stream to a compressor to form a compressed gas stream.

In some aspects, the bypass line outlet is located downstream of the second heat exchanger, and the second gas stream is the second cooled gas stream. That is, in some aspects, the bypass line is configured to bypass fine polyolefin particles around both the first and second heat exchangers. In some aspects, the method further comprises providing the first cooled gas stream to a compressor to form a compressed gas stream; and providing the compressed gas stream to the second heat exchanger. In some aspects, the system further comprises a compressor configured to compress the first cooled gas stream to form a compressed gas stream which is passed to the second heat exchanger.

In some aspects, the system may further include one or more adjustable valves at the bypass line inlet or the bypass line outlet configured to control a flow rate of the bypass stream. For example, in some aspects the system includes an adjustable valve at the bypass line outlet configured to control a flow rate of the bypass stream. In some aspects, the method may further include adjusting one or more valves at the bypass line inlet or bypass line outlet to control a flow rate of the bypass stream. For example, in some aspects the method may include adjusting a valve at the bypass line outlet to control a flow rate of the bypass stream. In some aspects, the valve may be a butterfly valve, a gate valve, or a ball valve.

In some aspects, the step of preferentially removing a portion of the entrained fine polyolefin particles from the gas outlet line to form a bypass stream comprising a higher concentration of the entrained fine polyolefin particles than is present in the first gas stream comprises removing from about 5 wt. % to about 75 wt. % of the first gas stream, for example about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or any ranges therebetween.

Surprisingly, in some aspects the step of preferentially removing a portion of the entrained fine polyolefin particles from the gas outlet line to form a bypass stream comprising a higher concentration of the entrained fine polyolefin particles than is present in the first gas stream results in a total cooling duty loss of from about 1% to about 20%, for example about 1%, about 2%, about 3%, about 4%, about 5%, about 10%, about 15%, about 20%, or any ranges therebetween. Without intending to be bound by any particular theory, it is hypothesized that, bypassing a portion of the gas outlet line around the first heat exchanger results in a cooling duty loss of the first heat exchanger. After the bypass portion is recombined with the gas outlet, the higher temperature of the combined gas results in increased cooling duty of the second heat exchanger, such that the total cooling duty is not reduced as much as it would be without the bypass.

In some aspects, the step of preferentially removing a portion of the entrained fine polyolefin particles from the gas outlet line to form a bypass stream comprising a higher concentration of the entrained fine polyolefin particles than is present in the first gas stream results in a cooling duty loss of the first heat exchanger of from about 5% to about 150%, for example about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 105%, about 110%, about 115%, about 120%, about 125%, about 130%, about 135%, about 140%, about 145%, about 150%, or any ranges therebetween. Without intending to be bound by any particular theory, it is believed that, by bypassing a portion of the gas outlet line around the first heat exchanger, this results in a cooling duty loss of the first heat exchanger.

In some aspects, the step of preferentially removing a portion of the entrained fine polyolefin particles from the gas outlet line to form a bypass stream comprising a higher concentration of the entrained fine polyolefin particles than is present in the first gas stream results in an increase in cooling duty of the second heat exchanger of from about 5% to about 50%, for example about 5%, about 10%, about 15%, about 20%, about 25%, about 30%, about 35%, about 40%, about 45%, about 50%, or any ranges therebetween. Without intending to be bound by any particular theory, it is hypothesized that bypassing a portion of the gas outlet line around the first heat exchanger and combining the bypass portion downstream of the first heat exchanger at a higher temperature before feeding to the second heat exchanger results in increased cooling duty of the second heat exchanger.

In some aspects, the step of preferentially removing a portion of the entrained fine polyolefin particles from the gas outlet line to form a bypass stream comprising a higher concentration of the entrained fine polyolefin particles than is present in the first gas stream results in decreased fouling in the first heat exchanger. Without intending to be bound by any particular theory, it is hypothesized that bypassing a portion of the gas outlet line, with its associated fine polyolefin particles, around the first heat exchanger results in fewer fine particles reaching the first heat exchanger, which in turn results in reduced fouling.

In some aspects, the step of preferentially removing a portion of the entrained fine polyolefin particles from the gas outlet line to form a bypass stream comprising a higher concentration of the entrained fine polyolefin particles than is present in the first gas stream results in no change in fouling in the second heat exchanger. Without intending to be bound by any particular theory, it is believed that the significantly reduced fouling in the second heat exchanger may be due to a "washing" action that the first cooled gas stream or second cooled gas stream may have on any solid polyolefin particles. Specifically, it is believed that some of the first cooled gas stream and/or the second cooled gas stream may exit the first heat exchanger and/or the second heat exchanger in liquid form, and that some of these liquids may remove or wash fine polymer particles from the heat exchanger and related piping. For example, liquid pentane and hexene are known to wash solid polyethylene particles. In operation with no bypass, "washing" is observed in the piping downstream of the first exchanger and in second heat exchanger, which shows little polymer build-up on any surface between cleanings. Conversely, all surfaces exposed to process gas on piping upstream of the first heat exchanger and in the first heat exchanger up to a certain point shows significant polymer build-up between cleanings. Thus, without intending to be bound by any particular theory, it is believed that if the temperature of the combined gas stream entering the second heat exchanger is below the dew point of the gas, then this stream will serve to wash any fine polyolefin particles from the second heat exchanger or following piping and systems. Hence, the washing serves to ensure the downstream heat exchanger remains clean so that its performance (especially its pressure drop) does not significantly degrade over time, even as the upstream heat exchanger fouls and more gas bypasses the upstream heat exchanger.

In some aspects, the bypass stream is configured to receive or preferentially remove or comprises up to about 80 wt. % of the entrained fine polyolefin particles in the first gas stream, for example from about 5 wt. % to about 75 wt.5 of the first gas stream, for example about 5 wt. %, about 10 wt. %, about 15 wt. %, about 20 wt. %, about 25 wt. %, about wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, or any ranges therebetween.

In some aspects, the gas outlet line comprises a substantially hemispherical bend. By "substantially hemispherical" it is meant that the gas outlet line comprises a bend which extends the full arc of a semicircule, that is 180°, or within ±10° of the full arc of a semicircle. Without intending to be bound by any particular theory, it is believed that passing the gas outlet stream through a substantially hemispherical bend may aid in the preferential separation of the entrained fine polyolefin particles to form the bypass stream. That is, it is believed that the centripetal force imparted on the fine polyolefin particles as they pass through the substantially hemispherical bend may preferentially separate the fine polyolefin particles to the inner surface of the gas outlet line which is at the outermost portion of the bend. Advantageously, by placing the bypass line inlet proximate to the outermost portion of the bend, these particles may then be preferentially separated from the gas outlet line to form a bypass stream. For example, in some aspects the bypass line is tangential to the hemispherical bend. That is, in some aspects the bypass line is tangential to the outermost portion of the bend. In some aspects, the bypass line is at an angle to the hemispherical bend. For example, in some aspects the bypass line is at an angle of from about 30 degrees to about 90 degrees from a line bisecting the substantially hemispherical bend, for example about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, or any ranges therebetween.

In some aspects, the bypass line inlet comprises a scoop extending into the gas outlet line. That is, in some aspects, the bypass line inlet comprises a projection extending into the gas outlet line to aid in removing the fine polyolefin particles.

In some aspects, the bypass line has an inner diameter which is from about 10% to about 40% of the inner diameter of the gas outlet line, for example about 10%, about 15%, about 20%, about 25%, about 30%, about 35%, about 40%, or any ranges therebetween. For example, in some aspects the bypass line has an inner diameter which is about 33% of the inner diameter of the gas outlet line, for example the bypass line may have an inner diameter of 12 inches while the gas outlet line has an inner diameter of 36 inches.

In some aspects, the bypass line inlet has an inner diameter which is from about 5% to about 50% greater than the inner diameter of the bypass line, for example about 5%, about 10%, about 15%, about 20%, about 25%, about 30%, about 35%, about 40%, about 45%, about 50%, or any ranges therebetween. For example, in some aspects the bypass line inlet has an inner diameter which is 50% greater than the inner diameter of the bypass line, for example the bypass line inlet may have an inner diameter of 18" at its widest point and then reduce to a 12" inner diameter of the bypass line. Without intending to be bound by any particular theory, it is believed that the larger inner diameter of the bypass line inlet may result in increased efficiency of preferentially separating the polyolefin particles as compared to a bypass line inlet having the same diameter as the bypass line.

In some aspects, the method further includes providing the first gas stream to a fines separator in fluid communication with the polymerization reactor and the gas outlet line to separate a first portion of the solid fines from the unreacted olefins before providing the first gas stream to the gas outlet line; and providing the first portion of the solid fines to an eductor in fluid communication with the fines separator to convey the first portion of the solid fines back to the polymerization reactor. In some aspects, the system further includes a fines separator in fluid communication with the polymerization reactor and gas outlet line configured to separate a first portion of the solid fines from the unreacted olefins before providing the first gas stream to the gas outlet line. In some aspects, the system further includes an eductor in fluid communication with the fines separator to convey the first portion of the solid fines back to the polymerization reactor. For example, in some aspects the eductor may be an eductor as described in U.S. patent application Ser. No. 15/730,314, which is hereby incorporated herein by reference in its entirety.

In some aspects, the eductor comprises a first tubular body having a hollow interior and comprising a first inlet and a first outlet spaced apart from the first inlet along a central axis, and a sidewall circumscribing the central axis and defining a mixing chamber; and a second tubular body having a hollow interior and comprising a second inlet and a spaced apart second outlet, wherein the second tubular body extends into the mixing chamber through the sidewall of the first tubular body between the first inlet and the first outlet, wherein the second inlet is oriented substantially perpendicular to the axis of the first tubular body, wherein the second tubular body comprises a first bend of less than 90° from perpendicular toward the first outlet before extending into the mixing chamber, and wherein the second tubular body comprises a second bend of less than 90° toward the first outlet after extending into the mixing chamber.

ILLUSTRATED EMBODIMENTS

FIG. 1 illustrates a schematic of a system and method of polymerizing olefins according to an aspect of the present disclosure. An inlet stream 101 comprising olefins is provided to a polymerization reactor 103 where the olefins are polymerized to form a polymerization reactor outlet stream 105 which comprises solid polyolefin particles and unreacted olefins and a solid polyolefin product stream 137. The inlet stream 101 and outlet stream 105 may include any suitable olefin, combination of olefins, and in some embodiments may include further components such as catalysts, polymerization initiators, chain length controlling agents, and the like, as would be understood by the skilled person.

The polymerization reactor outlet stream 105 is then passed to a cyclone 107, where it is separated into a gas stream 113 which comprises entrained fine solid polyolefin particles, and a stream of solid fines 116. The stream of solid fines 116 is then introduced to an eductor 109 along with a motive gas 131. In some embodiments, the inlet of the eductor 301 is immediately adjacent the solids outlet at the bottom of the cyclone, though this is not required.

A portion of the gas stream 113 is passed to a first heat exchanger 115 while a portion of the gas stream 113 which includes a preferentially separated portion of the solid polyolefin particles is separated into a bypass line 117. The first heat exchanger produces a first cooled gas stream 119, and the bypass stream 117 is combined with the first cooled gas stream 119 to form a combined stream 121 which is provided to a second heat exchanger 123 to produce a second cooled gas stream 125. The temperature of the combined stream 121 is below the dew point of the combined gas stream 121. The second cooled gas stream 125 is provided to a compressor 127 which produces a compressed gas stream 129. A portion of the compressed gas stream is provided to the eductor 109 as the motive gas 131, as discussed above. A portion of the compressed gas stream 129 is provided to a liquid separation vessel 133, which produces a liquid stream 139 and a gaseous stream 135 which is recycled to the polymerization reactor 103.

Figure 2:
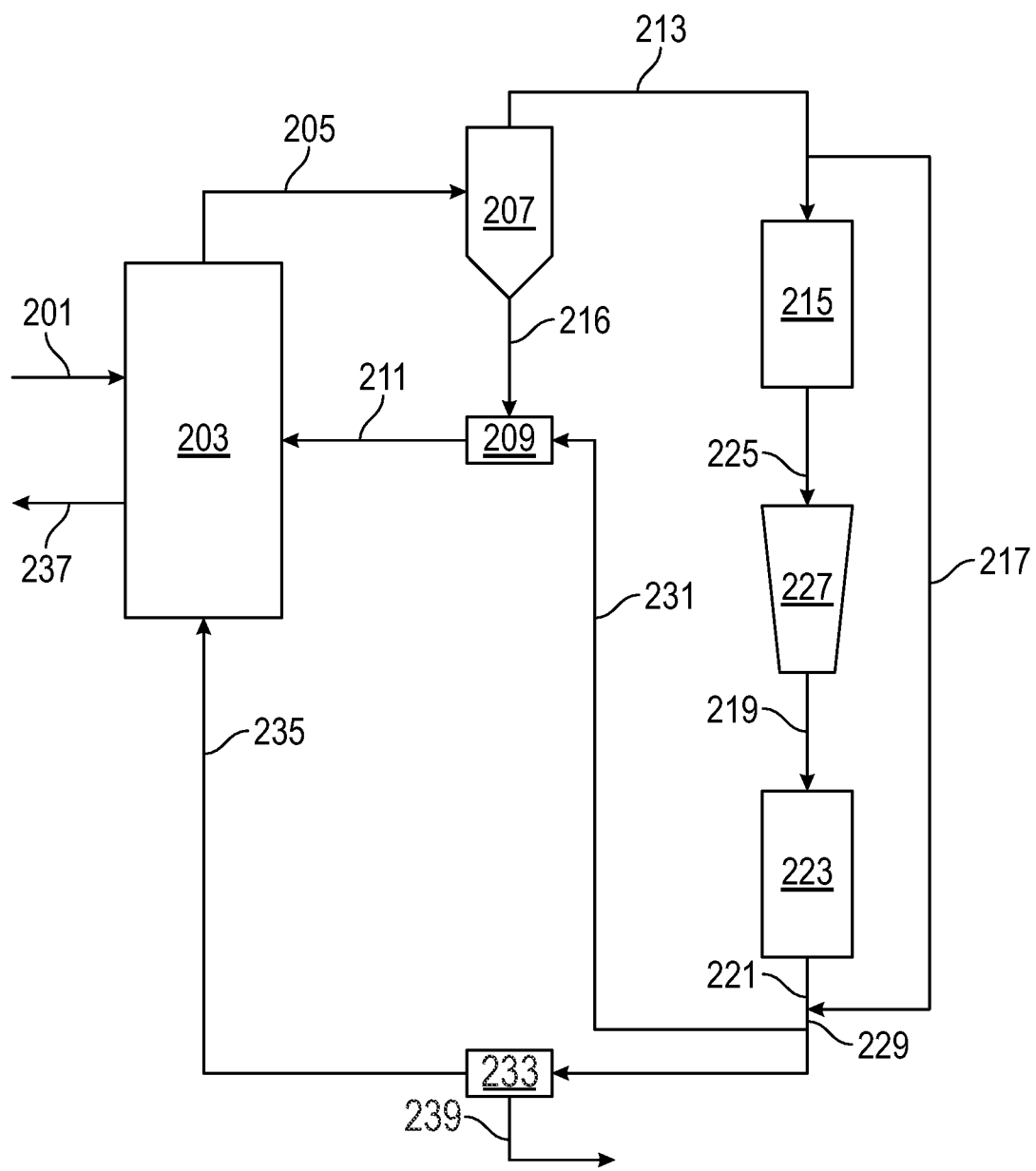
FIG. 2 illustrates a schematic of a system and method of polymerizing olefins according to another aspect of the present disclosure.

FIG. 2 illustrates a schematic of a system and method of polymerizing olefins according to another aspect of the present disclosure. An inlet stream 201 comprising olefins is provided to a polymerization reactor 203 where the olefins are polymerized to form a polymerization reactor outlet stream 205 which comprises solid polyolefin particles and unreacted olefins and a solid polyolefin product stream 237. The inlet stream 201 and outlet stream 205 may include any suitable olefin, combination of olefins, and in some embodiments may include further components such as catalysts, polymerization initiators, chain length controlling agents, and the like, as would be understood by the skilled person.

The polymerization reactor outlet stream 205 is then passed to a cyclone 207, where it is separated into a gas stream 213 which comprises entrained fine solid polyolefin particles, and a stream of solid fines 216. The stream of solid fines 216 is then introduced to an eductor 209 along with a motive gas 231. In some embodiments, the inlet of the eductor 201 is immediately adjacent the solids outlet at the bottom of the cyclone, though this is not required.

A portion of the gas stream 213 is passed to a first heat exchanger 215 while a portion of the gas stream 213 which includes a preferentially separated portion of the solid polyolefin particles is separated into a bypass line 217. The first heat exchanger produces a first cooled gas stream 225 which is provided to a compressor 227 to produce a compressed gas stream 219, which is provided to a second heat exchanger 223 to produce a second cooled gas stream 221. The bypass stream 217 is combined with the second cooled gas stream 221 to form a combined stream 229, having a temperature which is below the dew point of the combined gas stream 121. A portion of the combined gas stream 229 is provided to the eductor 209 as the motive gas 231, as discussed above. A portion of the combined gas stream 229 is provided to a liquid separation vessel 233, which produces a liquid stream 239 and a gaseous stream 235 which is recycled to the polymerization reactor 203.

Figure 3A:
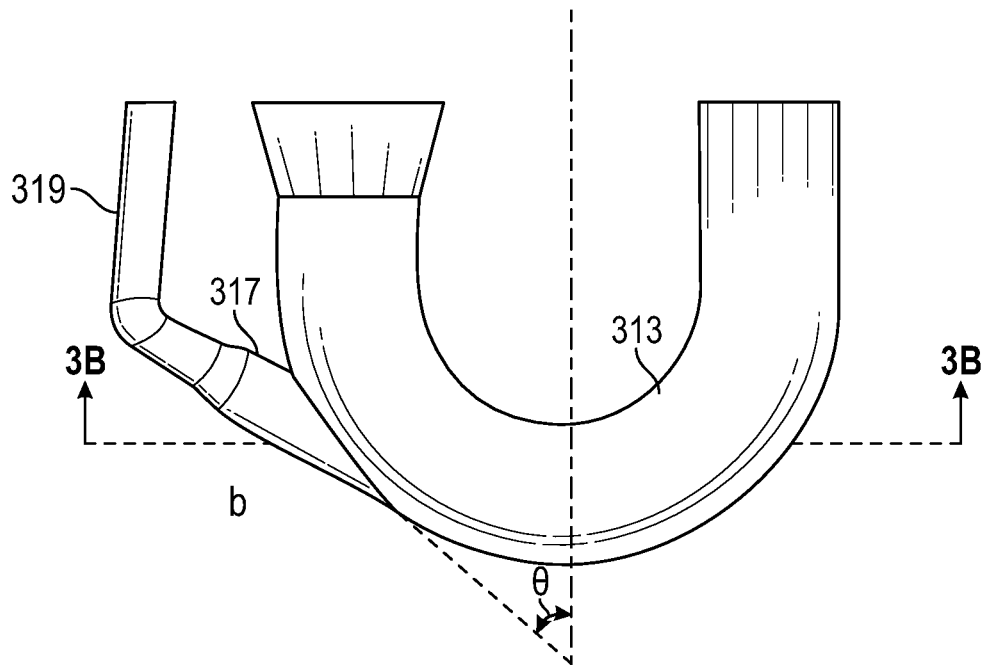
FIG. 3A illustrates a partial view of a substantially hemispherical bend in a gas outlet line, a bypass line inlet, and a bypass line according to an aspect of the present disclosure.
Figure 3B:
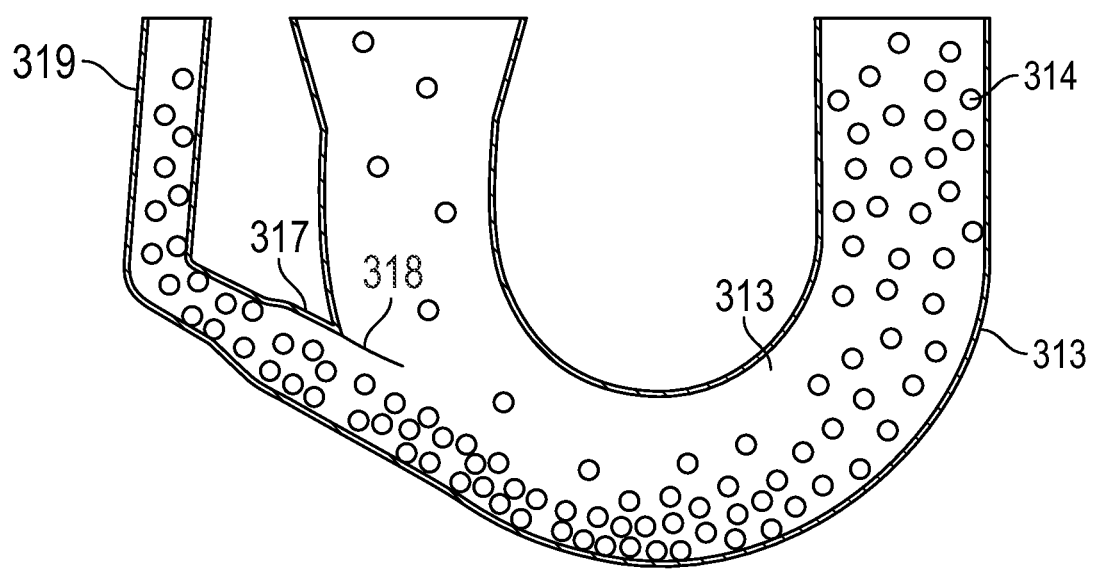
FIG. 3B illustrates a cross-sectional view of the partial view of FIG. 3A.

FIGS. 3A and 3B illustrate partial views of a substantially hemispherical bend in a gas outlet line and a bypass line inlet according to aspects of the present disclosure. FIG. 3B is a cross-sectional view of the substantially hemispherical bend of FIG. 3A, taken within the plane of the bend, along the line b-b. These figures illustrate a hemispherical bend in a gas outlet line 313, and a bypass line 319 including a bypass line inlet 317 which has a larger inner diameter than the bypass line 319. The bypass line inlet 317 further includes a scoop 318 which extends into the inner diameter of the gas outlet line 313, to further aid in preferentially separating solid polyolefin particles 314 from the gas outlet line 313 and into the bypass line 319 further, as illustrated in these figures, the bypass line inlet is disposed at an angle, θ from a line a which bisects the substantially hemispherical bend.

Figure 10:
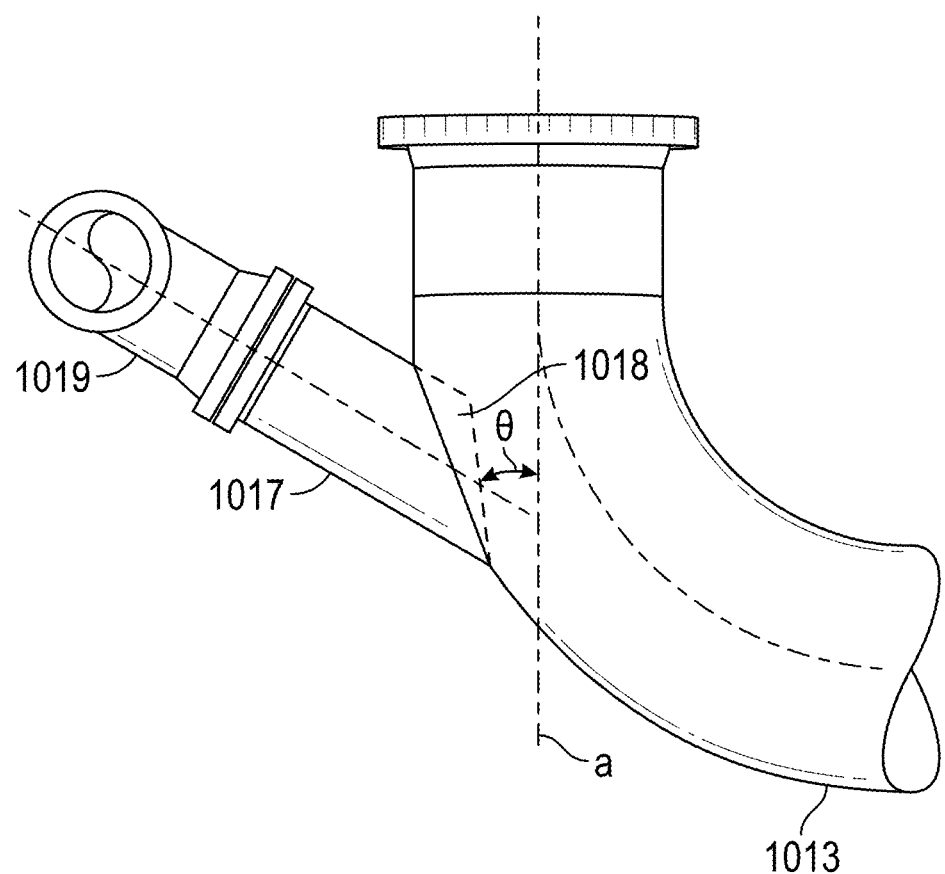
FIG. 10 illustrates a partial transparent view of a substantially hemispherical bend in a gas outlet line, a bypass line inlet, and a bypass line according to an aspect of the present disclosure.

FIG. 10 illustrates a partial transparent view of a substantially hemispherical bend in a gas outlet line 1013, a bypass line inlet 1017, and a bypass line 1019 according to an aspect of the present disclosure. Specifically, this figure illustrates a bypass line inlet 1017 which is at an angle θ from a line a which is parallel to a line bisecting the substantially hemispherical bend, but is not tangential to the outer surface of the substantially hemispherical bend. The bypass line inlet 1017 further includes a scoop 1018 which extends into the interior of the gas outlet line 1013. As shown in this figure, the scoop may simply be in the form of an extension of the bypass line inlet 1017. For example, the bypass inlet line may be formed by cutting a pipe at an angle, and by attaching said pipe to the gas outlet line so that one end of the pipe is substantially flush with the gas outlet line, and the other side of the gas outlet line extends into the interior of the gas outlet line. For example, in some embodiments the gas outlet line may have an inner diameter which is about 50% of the inner diameter of the gas outlet line, and the scoop may extend into the interior of the gas outlet line by about $\frac{1}{9}^{th}$ of the inner diameter. For example, in one embodiment, the bypass line inlet may have an inner diameter of about 18", the gas outlet line may have an inner diameter of about 36", and the scoop may extend into the interior of the gas outlet line by about 4".

1-inch diameter tubes that are 38 feet in length. For this example, the flow rate of process gas entering the heat exchanger was 1,800,000 pounds per hour (lb/hr) at a temperature of 206.5° F. The flow rate of cooling water is 24,000 gallons per minute (GPM) at a temperature 100.6° F. The process gas had the following composition: 5.0 mol. % hydrogen, 28.3 mol. % ethylene, 18.4 mol. % iso-pentane, 48.0 mol. % nitrogen, and 0.3 mol. % 1-hexene. At the start of run, the pressure drop through the first heat exchanger is 2.5 psi and 2.0 psi through the second heat exchanger.

Figure 4:
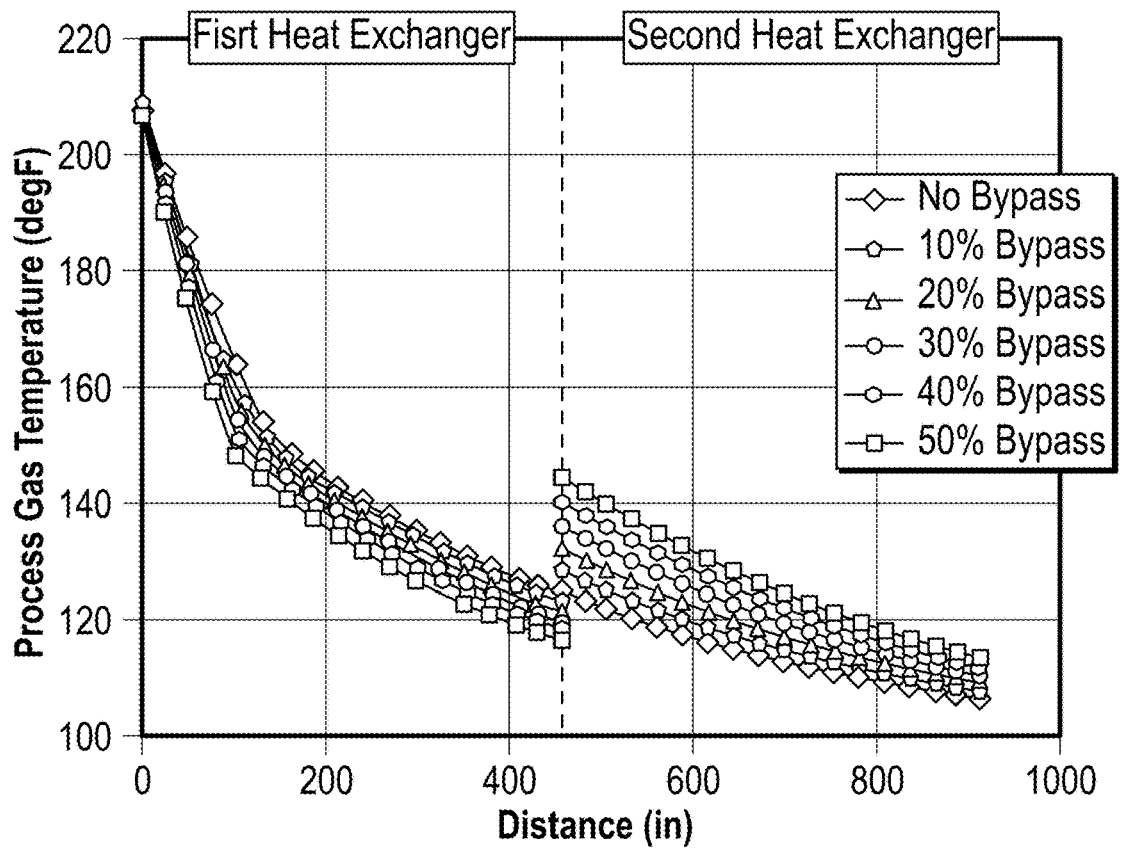
FIG. 4 illustrates the process gas temperature along a first and second heat exchanger in a system according to an embodiment of the present disclosure.
Figure 5:
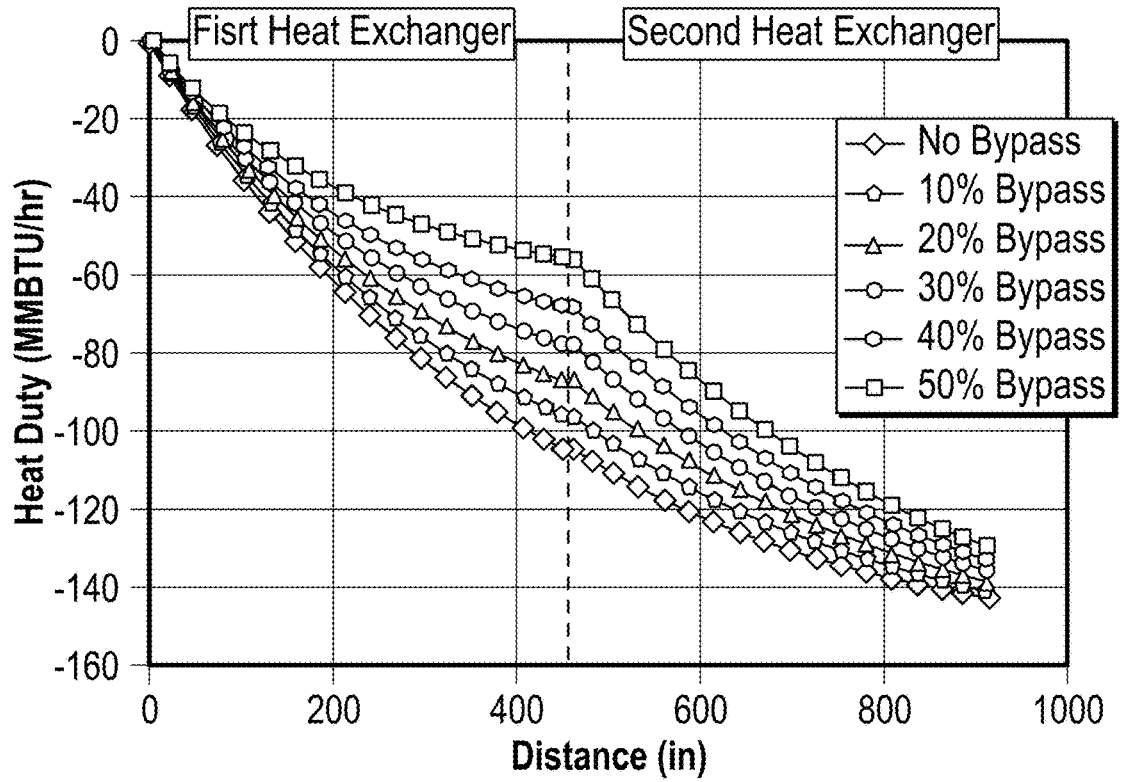
FIG. 5 illustrates the cooling duty along a first and second heat exchanger in a system according to an embodiment of the present disclosure.

FIG. 4 illustrates the process gas temperature along the length of the first heat exchanger on the left side and the second heat exchanger on the right for various wt % of bypass. FIG. 5 illustrates the cooling duty in MMBTU/hr in the first heat exchanger on the left side and the second heat exchanger on the right side for various wt % of bypass. As can be seen from these figures, the bypass has a relatively small effect on the overall process gas temperature or overall cooling duty at the end of the second heat exchanger. The data is further shown in Table 1 below. This table shows that the model predicts only an 8.8% reduction in overall cooling duty at 50% bypass. In addition, at 50% bypass, the combined stream entering the second heat exchanger is below the dew point because 3.3 wt. % liquid is predicted. Without intending to be bound by any particular theory, it is hypothesized that this should enable the second heat exchanger to remain clean at 50% bypass because it is still being "washed" with the condensed liquid.

TABLE 1

Properties of Heat Exchanger System

| Bypass | Total Duty (MMBTU/hr) | Duty/ Duty with No Bypass | Cooling Water out (° F.) | Process Gas Entering Second Heat Exchanger (° F.) | Liquid Entering Second Heat Exchanger (wt %) | Process Gas out (° F.) | Duty of First Heat Exchanger (MMBTU/hr) | Duty of Second Heat Exchanger (MMBTU/hr) |
|---|---|---|---|---|---|---|---|---|
| 0% | 143.77 | 100.0% | 112.7 | 124.3 | 14.7% | 106.9 | 109.15 | 34.62 |
| 10% | 141.66 | 98.5% | 112.5 | 128.1 | 12.8% | 108.1 | 100.90 | 40.77 |
| 20% | 139.35 | 96.9% | 112.3 | 131.9 | 10.5% | 109.3 | 92.25 | 47.10 |
| 30% | 136.87 | 95.2% | 112.1 | 135.8 | 8.3% | 110.7 | 82.99 | 53.88 |
| 40% | 134.13 | 93.3% | 111.9 | 139.9 | 5.9% | 112.1 | 73.09 | 61.04 |
| 50% | 131.15 | 91.2% | 111.6 | 144.0 | 3.3% | 113.6 | 62.66 | 68.49 |

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1: Mathematical Modeling of System for Reducing Heat Exchanger Fouling

ASPEN EDR software, available from ApenTech, and ANSYS® FLUENT software were used to model a dual heat exchanger system with a bypass line bypassing the first heat exchanger. In this study, the two identical shell-and-tube heat exchangers were arranged in series, with process gas flowing on the tube side and cooling water flowing countercurrently on the shell side. Both heat exchangers had 2,229

Computational fluid dynamics (CFD) models were utilized to determine the bypass amounts corresponding to different fouling conditions in the first heat exchanger using ANSYS® FLUENT software. Three cases were performed representing start-of-run, middle-of-run, and end-of-run fouling conditions in the original heat exchanger system (no bypass), assuming the second heat exchanger remains relatively clean. These same fouling conditions were also modeled using a 12" bypass line with an 18" bypass inlet. The particles used to simulate the polymer particles were 100 μm particles with a density of 0.85 g/cm³. The results of these simulations are shown in Table 2. These results confirm that the design of the bypass inlet increases the particle loading of the bypass flow. These results also confirm that the system pressure drop is significantly lower for a given fouling state because the amount of bypass increases as the first heat exchanger fouls. In addition, these results state that a longer run length is expected given a specific fouling rate of the first heat exchanger because the system pressure drop is lower for a given fouling condition.

TABLE 2

CFD Simulation Results for Bypass of the Heat Exchanger System

| Configuration | Condition | Gas Bypass Amount | Particle Bypass Amount | Total Pressure Drop | First Heat Exchanger Pressure Drop | Second Heat Exchanger Pressure Drop |
|---|---|---|---|---|---|---|
| Original | Start of Run | NA | NA | 4.5 psi | 2.5 psi | 2.0 psi |
| Original | Middle of Run | NA | NA | 12.0 psi | 10.0 psi | 2.0 psi |
| Original | End of Run | NA | NA | 32.0 psi | 30.0 psi | 2.0 psi |
| 12" Bypass | Start of Run | 18% | 33% | 3.75 psi | 1.75 psi | 2.0 psi |
| 12" Bypass | Middle of Run | 30% | 38% | 7.0 psi | 5.0 psi | 2.0 psi |
| 12" Bypass | End of Run | 42% | 49% | 12.25 psi | 10.25 psi | 2.0 psi |

Figure 6:
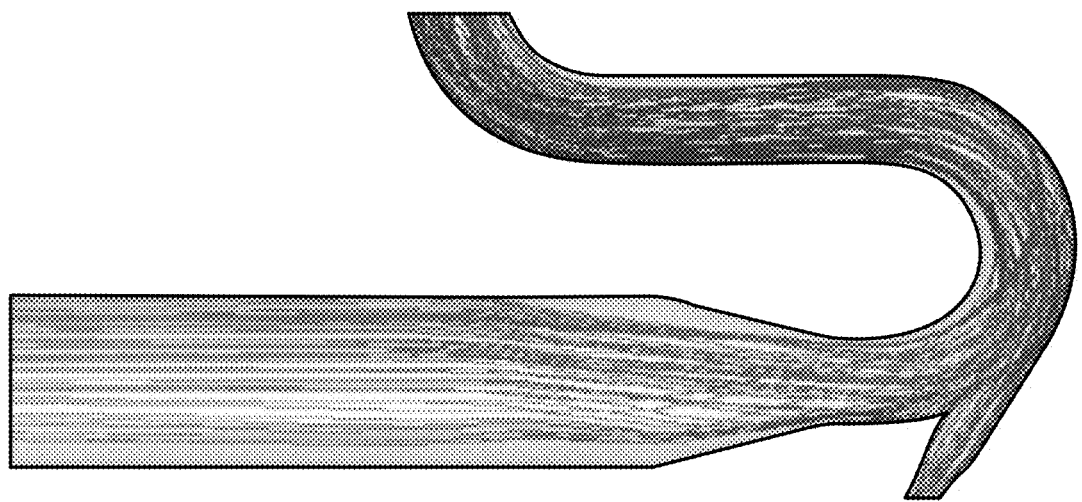
FIG. 6 illustrates polymer particle tracks in a system according to an embodiment of the present disclosure.
Figure 7:
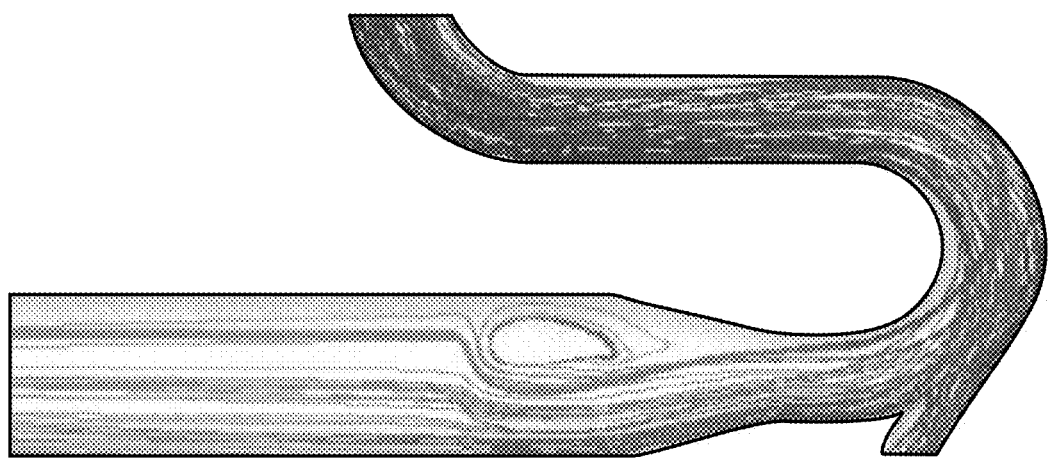
FIG. 7 illustrates polymer particle tracks in a system according to an embodiment of the present disclosure.

FIGS. 6 and 7 illustrate polymer particle tracks modeled using CFD. Specifically, FIG. 6 illustrates the polymer particle tracks at the beginning of a run and show 33 wt. % particle bypass, and FIG. 7 illustrates the polymer particle tracks at the end of a run and show 49 wt. % particle bypass. The particles are entrained in a gas stream and enter from the top of these figures, following the substantially hemispherical bend, and a portion of the particles are preferentially removed through the tangential bypass line.

Figure 9:
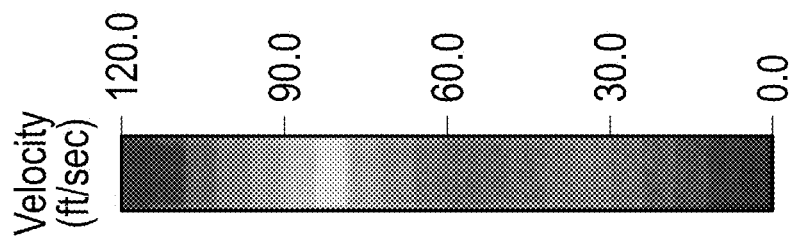
FIG. 9 illustrates the velocity vectors of polymer particles at the bypass line inlet in a system according to an embodiment of the present disclosure.
Figure 9:
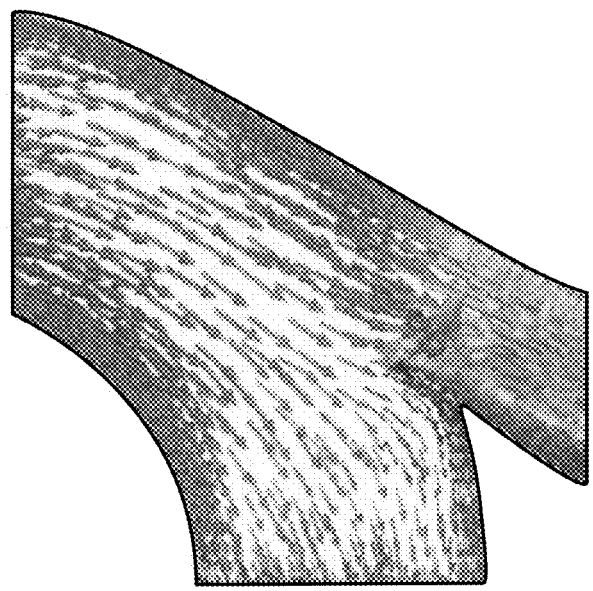
Figure 8:
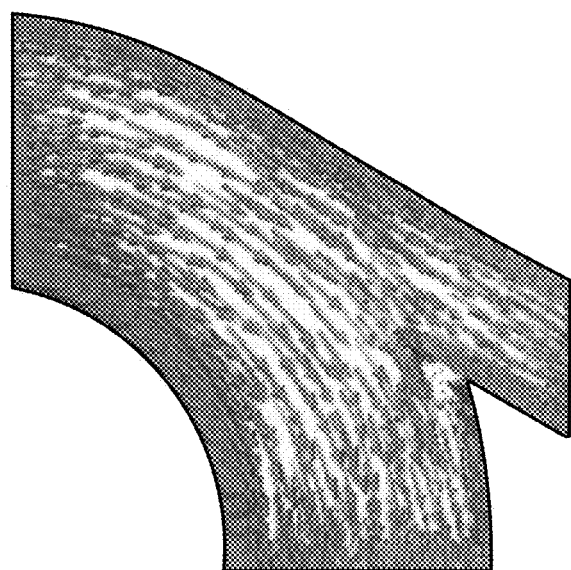
FIG. 8 illustrates the velocity vectors of polymer particles at the bypass line inlet in a system according to an embodiment of the present disclosure.

FIGS. 8 and 9 illustrates the velocity vectors at the bypass line inlet. Specifically, FIG. 8 illustrates the velocity vectors of the gas at the bypass line inlet at the start of the run and show 18% gas bypass, while FIG. 9 illustrates the velocity vectors of polymer particles at the bypass line inlet at the end of the run and show 42% gas bypass. As these figures illustrate, flow entering the bypass line increases as the fouling in the first heat exchanger increases, resulting in less flow and a lower pressure drop through the first heat exchanger.

ASPECTS

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments typically are described as "comprising" but, alternatively, can "consist essentially of" or "consist of" unless specifically stated otherwise).

According to a first aspect of the present disclosure, a method of reducing heat exchanger fouling rate is provided, the method comprising: providing a first gas stream comprising a gas and entrained fine polyolefin particles to a gas outlet line; preferentially removing a portion of the entrained fine polyolefin particles from the gas outlet line to form a bypass stream comprising a higher concentration of the entrained fine polyolefin particles than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

According to a second aspect of the present disclosure, a method according to the first aspect is provided, wherein the first gas stream comprises one or more of unreacted olefins, nitrogen, hydrogen, and one or more paraffins.

According to a third aspect of the present disclosure, a method according to any one of the first or second aspects is provided, wherein the first gas stream comprises one or more of pentane, iso-pentane, hexene, 1-hexene, ethylene, nitrogen, and hydrogen.

According to a fourth aspect of the present disclosure, a method according to any one of the first to third aspects is provided, wherein the fine polyolefin particles comprise polyethylene.

According to a fifth aspect of the present disclosure, a method according to any one of the first to fourth aspects is provided, further comprising providing the first cooled gas stream to a second heat exchanger, which produces a second cooled gas stream.

According to a sixth aspect of the present disclosure, a method according to any one of the first to fifth aspects is provided, wherein the bypass line outlet is located upstream of the second heat exchanger, and wherein the second gas stream is the first cooled gas stream.

According to a seventh aspect of the present disclosure, a method according to any one of the first to sixth aspects is provided, further comprising providing the second cooled gas stream to a compressor to form a compressed gas stream.

According to an eighth aspect of the present disclosure, a method according to any one of the first to seventh aspects is provided, wherein the bypass line outlet is located downstream of the second heat exchanger, and wherein the second gas stream is the second cooled gas stream.

According to a ninth aspect of the present disclosure, a method according to any one of the first to eighth aspects is provided, further comprising providing the first cooled gas stream to a compressor to form a compressed gas stream; and providing the compressed gas stream to the second heat exchanger.

According to a tenth aspect of the present disclosure, a method according to any one of the first to ninth aspects is provided, further comprising adjusting a valve at the bypass line outlet to control a flow rate of the bypass stream.

According to an eleventh aspect of the present disclosure, a method according to any one of the first to tenth aspects is provided, wherein the step of preferentially removing a portion of the entrained fine polyolefin particles from the gas outlet line to form a bypass stream comprising a higher concentration of the entrained fine polyolefin particles than is present in the first gas stream comprises removing from about 5 wt. % to about 75 wt. % of the first gas stream.

According to a twelfth aspect of the present disclosure, a method according to any one of the first to eleventh aspects is provided, wherein the step of preferentially removing a portion of the entrained fine polyolefin particles from the gas outlet line to form a bypass stream comprising a higher concentration of the entrained fine polyolefin particles than is present in the first gas stream results in a cooling duty loss of from about 5% to about 20%.

According to a thirteenth aspect of the present disclosure, a method according to any one of the first to twelfth aspects is provided, wherein the step of preferentially removing a portion of the entrained fine polyolefin particles from the gas outlet line to form a bypass stream comprising a higher concentration of the entrained fine polyolefin particles than is present in the first gas stream results in a cooling duty loss of the first heat exchanger of from about 1% to about 50%.

According to a fourteenth aspect of the present disclosure, a method according to any one of the first to thirteenth aspects is provided, wherein the step of preferentially removing a portion of the entrained fine polyolefin particles from the gas outlet line to form a bypass stream comprising a higher concentration of the entrained fine polyolefin particles than is present in the first gas stream results in an increase in cooling duty of the second heat exchanger of from about 5% to about 150%.

According to a fifteenth aspect of the present disclosure, a method according to any one of the first to fourteenth aspects is provided, wherein the bypass stream comprises up to about 80 wt. % of the entrained fine polyolefin particles in the first gas stream.

According to a sixteenth aspect of the present disclosure, a method according to any one of the first to fifteenth aspects is provided, wherein the fine polyolefin particles have an average diameter of less than about 200 μm.

According to a seventeenth aspect of the present disclosure, a method according to any one of the first to sixteenth aspects is provided, wherein the fine polyolefin particles have an average diameter of less than about 150 μm.

According to an eighteenth aspect of the present disclosure, a method according to any one of the first to seventeenth aspects is provided, wherein the fine polyolefin particles have an average diameter of less than about 10 μm.

According to a nineteenth aspect of the present disclosure, a method according to any one of the first to eighteenth aspects is provided, wherein the gas outlet line comprises a substantially hemispherical bend.

According to a twentieth aspect of the present disclosure, a method according to any one of the first to nineteenth aspects is provided, wherein the bypass line is tangential to the hemispherical bend.

According to a twenty-first aspect of the present disclosure, a method according to any one of the first to twentieth aspects is provided, wherein the bypass line is at an angle of from about 30 degrees to about 90 degrees from a line bisecting the substantially hemispherical bend.

According to a twenty-second aspect of the present disclosure, a system for reducing heat exchanger fouling rate is provided, the system comprising: a gas outlet line configured to pass a first gas stream comprising a gas and entrained fine polyolefin particles; a first heat exchanger configured to receive at least a portion of the first gas stream and produce a first cooled gas stream; and a bypass line configured to preferentially remove a portion of the entrained fine polyolefin particles from the gas outlet line to form a bypass stream comprising a higher concentration of the entrained fine polyolefin particles than is present in the first gas stream, the bypass line comprising a bypass line inlet and a bypass line outlet, wherein the bypass line inlet is located upstream of the first heat exchanger, wherein the bypass line outlet is located downstream of the first heat exchanger, and wherein a the bypass line is configured so that the bypass stream is combined with a second gas stream at the bypass line outlet to form a combined gas stream comprising one or more olefins or paraffins, and the temperature of the combined gas stream is below the dew point of the combined gas stream.

According to a twenty-third aspect of the present disclosure, a system according the twenty-second aspect is provided, wherein the first gas stream comprises one or more of unreacted olefins, nitrogen, hydrogen, and one or more paraffins.

According to a twenty-fourth aspect of the present disclosure, a system according to any one of the twenty-second to twenty-third aspects is provided, wherein the first gas stream comprises one or more of pentane, iso-pentane, hexene, 1-hexene, ethylene, nitrogen, and hydrogen.

According to a twenty-fifth aspect of the present disclosure, a system according to any one of the twenty-second to twenty-fourth aspects is provided, wherein the fine polyolefin particles comprise polyethylene.

According to a twenty-sixth aspect of the present disclosure, a system according to any one of the twenty-second to twenty-fifth aspects is provided, wherein the system further comprises a second heat exchanger downstream of the first heat exchanger, and wherein the second heat exchanger is configured to produce a second cooled gas stream.

According to a twenty-seventh aspect of the present disclosure, a system according to any one of the twenty-second to twenty-sixth aspects is provided, wherein the bypass line outlet is located upstream of the second heat exchanger, and wherein the second gas stream is the first cooled gas stream.

According to a twenty-eighth aspect of the present disclosure, a system according to any one of the twenty-second to twenty-seventh aspects is provided, wherein the system further comprises a compressor configured to compress the second cooled gas stream to form a compressed gas stream.

According to a twenty-ninth aspect of the present disclosure, a system according to any one of the twenty-second to twenty-sixth aspects is provided, wherein the bypass line outlet is located downstream of the second heat exchanger, and wherein the second gas stream is the second cooled gas stream.

According to a thirtieth aspect of the present disclosure, a system according to the twenty-ninth aspect is provided, wherein the system further comprises a compressor configured to compress the first cooled gas stream to form a compressed gas stream which is passed to the second heat exchanger.

According to a thirty-first aspect of the present disclosure, a system according to any one of the twenty-second to thirtieth aspects is provided, wherein the system further comprises an adjustable valve at the bypass line outlet to control a flow rate of the bypass stream.

According to a thirty-second aspect of the present disclosure, a system according to any one of the twenty-second to thirty-first aspects is provided, wherein the bypass line inlet comprises a scoop extending into the gas outlet line.

According to a thirty-third aspect of the present disclosure, a system according to any one of the twenty-second to thirty-second aspects is provided, wherein the bypass line is configured to receive from about 5 wt. % to about 75 wt. % of the first gas stream.

According to a thirty-fourth aspect of the present disclosure, a system according to any one of the twenty-second to thirty-third aspects is provided, wherein the gas outlet line comprises a substantially hemispherical bend.

According to a thirty-fifth aspect of the present disclosure, a system according to the thirty-fourth aspect is provided, wherein the bypass line is tangential to the hemispherical bend.

According to a thirty-sixth aspect of the present disclosure, a system according to the thirty-fourth aspect is provided, wherein the bypass line is at an angle of from about 30 degrees to about 90 degrees from a line bisecting the substantially hemispherical bend.

According to a thirty-seventh aspect of the present disclosure, a system according to any one of the twenty-second to thirty-sixth aspects is provided, wherein the bypass line is configured to preferentially remove up to about 80 wt. % of the entrained fine polyolefin particles in the gas outlet line.

According to a thirty-eighth aspect of the present disclosure, a system according to any one of the twenty-second to thirty-seventh aspects is provided, wherein the fine polyolefin particles have an average diameter of less than about 200 µm.

According to a thirty-ninth aspect of the present disclosure, a system according to any one of the twenty-second to thirty-eighth aspects is provided, wherein the fine polyolefin particles have an average diameter of less than about 150 µm.

According to a fortieth aspect of the present disclosure, a system according to any one of the twenty-second to thirty-ninth aspects is provided, wherein the fine polyolefin particles have an average diameter of less than about 10 µm.

According to a forty-first aspect of the present disclosure, a system according to any one of the twenty-second to fortieth aspects is provided, wherein the bypass line has an inner diameter which is from about 10% to about 40% of the inner diameter of the gas outlet line.

According to a forty-second aspect of the present disclosure, a system according to any one of the twenty-second to forty-first aspects is provided, wherein the bypass line inlet has an inner diameter which is from about 5% to about 50% greater than the inner diameter of the bypass line.

According to a forty-third aspect of the present disclosure, a method of polymerizing olefins is provided, the method comprising: contacting one or more olefins with a catalyst under polymerization conditions in a polymerization reactor to form a first gas stream comprising solid fines and unreacted olefins; providing the first gas stream to a gas outlet line; preferentially removing a portion of the solid fines from the gas outlet line to form a bypass stream comprising a higher concentration of the solid fines than is present in the first gas stream; providing the bypass stream to a bypass line comprising a bypass line inlet and a bypass line outlet, wherein the bypass line inlet is located upstream of a first heat exchanger, and wherein the bypass line outlet is located downstream of the first heat exchanger; providing at least a portion of the first gas stream to the first heat exchanger, which produces a first cooled gas stream; and combining the bypass stream and a second gas stream at the bypass line outlet to form a combined gas stream comprising one or more olefins or paraffins, wherein a temperature of the combined gas stream is below the dew point of the combined gas stream.

According to a forty-fourth aspect of the present disclosure, a method according to the forty-third aspect is provided, further comprising: providing the first gas stream to a fines separator in fluid communication with the polymerization reactor and the gas outlet line to separate a first portion of the solid fines from the unreacted olefins before providing the first gas stream to the gas outlet line; and providing the first portion of the solid fines to an eductor in fluid communication with the fines separator to convey the first portion of the solid fines back to the polymerization reactor.

According to a forty-fifth aspect of the present disclosure, a method according to the forty-fourth aspect is provided, wherein the eductor comprises: a first tubular body having a hollow interior and comprising a first inlet and a first outlet spaced apart from the first inlet along a central axis, and a sidewall circumscribing the central axis and defining a mixing chamber; and a second tubular body having a hollow interior and comprising a second inlet and a spaced apart second outlet, wherein the second tubular body extends into the mixing chamber through the sidewall of the first tubular body between the first inlet and the first outlet, wherein the second inlet is oriented substantially perpendicular to the axis of the first tubular body, wherein the second tubular body comprises a first bend of less than 90° from perpendicular toward the first outlet before extending into the mixing chamber, and wherein the second tubular body comprises a second bend of less than 90° toward the first outlet after extending into the mixing chamber.

According to a forty-sixth aspect of the present disclosure, a method according to any one of the forty-third to forty-fifth aspects is provided, wherein the first gas stream comprises one or more of unreacted olefins, nitrogen, hydrogen, and one or more paraffins.

According to a forty-seventh aspect of the present disclosure, a method according to any one of the forty-third to forty-sixth aspects is provided, wherein the first gas stream comprises one or more of pentane, iso-pentane, hexene, 1-hexene, ethylene, nitrogen, and hydrogen.

According to a forty-eighth aspect of the present disclosure, a method according to any one of the forty-third to forty-seventh aspects is provided, wherein the fine polyolefin particles comprise polyethylene.

According to a forty-ninth aspect of the present disclosure, a method according to any one of the forty-third to forty-eighth aspects is provided, further comprising providing the first cooled gas stream to a second heat exchanger, which produces a second cooled gas stream.

According to a fiftieth aspect of the present disclosure, a method according to any one of the forty-third to forty-ninth aspects is provided, wherein the bypass line outlet is located upstream of the second heat exchanger, and wherein the second gas stream is the first cooled gas stream.

According to a fifty-first aspect of the present disclosure, a method according to the fiftieth aspect is provided, further comprising providing the second cooled gas stream to a compressor to form a compressed gas stream.

According to a fifty-second aspect of the present disclosure, a method according to any one of the forty-third to forty-ninth aspects is provided, wherein the bypass line outlet is located downstream of the second heat exchanger, and wherein the second gas stream is the second cooled gas stream.

According to a fifty-third aspect of the present disclosure, a method according to the fifty-second aspect is provided, further comprising providing the first cooled gas stream to a compressor to form a compressed gas stream; and providing the compressed gas stream to the second heat exchanger.

According to a fifty-fourth aspect of the present disclosure, a method according to any one of the forty-third to fifty-third aspects is provided, further comprising adjusting a valve at the bypass line outlet to control a flow rate of the bypass stream.

According to a fifty-fifth aspect of the present disclosure, a method according to any one of the forty-third to fifty-fourth aspects is provided, wherein the step of preferentially removing a portion of the entrained fine polyolefin particles from the gas outlet line to form a bypass stream comprising a higher concentration of the entrained fine polyolefin particles than is present in the first gas stream comprises removing from about 5 wt. % to about 75 wt. % of the first gas stream.

According to a fifty-sixth aspect of the present disclosure, a method according to any one of the forty-third to fifty-fifth aspects is provided, wherein the step of preferentially removing a portion of the entrained fine polyolefin particles from the gas outlet line to form a bypass stream comprising a higher concentration of the entrained fine polyolefin particles than is present in the first gas stream results in a cooling duty loss of from about 1% to about 20%.

According to a fifty-seventh aspect of the present disclosure, a method according to any one of the forty-third to fifty-sixth aspects is provided, wherein the step of preferentially removing a portion of the entrained fine polyolefin particles from the gas line to form a bypass stream comprising a higher concentration of the entrained fine polyolefin particles than is present in the first gas stream results in a cooling duty loss of the first heat exchanger of from about 1% to about 50%.

According to a fifty-eighth aspect of the present disclosure, a method according to any one of the forty-third to fifty-sixth aspects is provided, wherein the step of preferentially removing a portion of the entrained fine polyolefin particles from the gas line to form a bypass stream comprising a higher concentration of the entrained fine polyolefin particles than is present in the first gas stream results in a cooling duty loss of the first heat exchanger of from about 5% to about 150%.

According to a fifty-ninth aspect of the present disclosure, a method according to any one of the forty-third to fifty-eighth aspects is provided, wherein the bypass stream comprises up to about 80 wt. % of the entrained fine polyolefin particles in the first gas stream.

According to a sixtieth aspect of the present disclosure, a method according to any one of the forty-third to fifty-ninth aspects is provided, wherein the fine polyolefin particles have an average diameter of less than about 200 μm.

According to a sixty-first aspect of the present disclosure, a method according to any one of the forty-third to sixtieth aspects is provided, wherein the fine polyolefin particles have an average diameter of less than about 150 μm.

According to a sixty-second aspect of the present disclosure, a method according to any one of the forty-third to sixty-first aspects is provided, wherein the fine polyolefin particles have an average diameter of less than about 10 μm.

According to a sixty-third aspect of the present disclosure, a system for polymerizing olefins is provided, the system comprising: a polymerization reactor for contacting one or more olefins with a catalyst under polymerization conditions to form a first gas stream comprising solid fines and unreacted olefins; a gas outlet line configured to receive the first gas stream; a first heat exchanger configured to receive at least a portion of the first gas stream and produce a cooled gas stream; a bypass line configured to preferentially remove a portion of the solid fines from the gas outlet line to form a bypass stream comprising a higher concentration of the solid fines, the bypass line comprising an inlet and an outlet, wherein the inlet is located upstream of the first heat exchanger, wherein the outlet is located downstream of the first heat exchanger, and wherein the bypass line is configured so that the bypass stream is combined with a second gas stream at the bypass line outlet to form a combined gas stream comprising one or more olefins or paraffins, and the temperature of the combined gas stream is below the dew point of the combined gas stream.

According to a sixty-fourth aspect of the present disclosure, a system according to the sixty-third is provided, wherein the system further comprises: a fines separator in fluid communication with the polymerization reactor for separating the solid fines from the unreacted olefins; and an eductor in fluid communication with the fines separator for conveying the solid fines back to the polymerization reactor.

According to a sixty-fifth aspect of the present disclosure, a system according to the sixty-fourth aspect is provided, wherein the eductor comprises: a first tubular body having a hollow interior and comprising a first inlet and a first outlet spaced apart from the first inlet along a central axis, and a sidewall circumscribing the central axis and defining a mixing chamber; and a second tubular body having a hollow interior and comprising a second inlet and a spaced apart second outlet, wherein the second tubular body extends into the mixing chamber through the sidewall of the first tubular body between the first inlet and the first outlet, wherein the second inlet is oriented substantially perpendicular to the axis of the first tubular body, wherein the second tubular body comprises a first bend of less than 90° from perpendicular toward the first outlet before extending into the mixing chamber, and wherein the second tubular body comprises a second bend of less than 90° toward the first outlet after extending into the mixing chamber.

According to a sixty-sixth aspect of the present disclosure, a system according to any one of the sixty-third to sixty-fifth aspects is provided, wherein the first gas stream comprises one or more of unreacted olefins, nitrogen, hydrogen, and one or more paraffins.

According to a sixty-seventh aspect of the present disclosure, a system according to any one of the sixty-third to sixty-sixth aspects is provided, wherein the first gas stream comprises one or more of pentane, iso-pentane, hexene, 1-hexene, ethylene, nitrogen, and hydrogen.

According to a sixty-eighth aspect of the present disclosure, a system according to any one of the sixty-third to sixty-seventh aspects is provided, wherein the fine polyolefin particles comprise polyethylene.

According to a sixty-ninth aspect of the present disclosure, a system according to any one of the sixty-third to sixty-eighth aspects is provided, wherein the system further comprises a second heat exchanger downstream of the first heat exchanger, and wherein the second heat exchanger is configured to produce a second cooled gas stream.

According to a seventieth aspect of the present disclosure, a system according to any one of the sixty-third to sixty-ninth aspects is provided, wherein the bypass line outlet is located upstream of the second heat exchanger, and wherein the second gas stream is the first cooled gas stream.

According to a seventy-first aspect of the present disclosure, a system according to the seventieth aspect is provided, wherein the system further comprises a compressor configured to compress the second cooled gas stream to form a compressed gas stream.

According to a seventy-second aspect of the present disclosure, a system according to any one of the sixty-third to sixty-ninth aspects is provided, wherein the bypass line outlet is located downstream of the second heat exchanger, and wherein the second gas stream is the second cooled gas stream.

According to a seventy-third aspect of the present disclosure, a system according the seventy-second aspect is provided, wherein the system further comprises a compressor configured to compress the first cooled gas stream to form a compressed gas stream which is passed to the second heat exchanger.

According to a seventy-fourth aspect of the present disclosure, a system according to any one of the sixty-third to seventy-third aspects is provided, wherein the system further comprises an adjustable valve at the bypass line outlet to control a flow rate of the bypass stream.

According to a seventy-fifth aspect of the present disclosure, a system according to any one of the sixty-third to seventy-fourth aspects is provided, wherein the bypass line inlet comprises a scoop extending into the gas outlet line.

According to a seventy-sixth aspect of the present disclosure, a system according to any one of the sixty-third to seventy-fifth aspects is provided, wherein the bypass line is configured to receive from about 5 wt. % to about 50 wt. % of the first gas stream.

According to a seventy-seventh aspect of the present disclosure, a system according to any one of the sixty-third to seventy-sixth aspects is provided, wherein the gas outlet line comprises a substantially hemispherical bend.

According to a seventy-eighth aspect of the present disclosure, a system according to the seventy-seventh aspect is provided, wherein the bypass line is tangential to the hemispherical bend.

According to a seventy-ninth aspect of the present disclosure, a system according to the seventy-seventh aspect is provided, wherein the bypass line is at an angle of from about 30 degrees to about 90 degrees from a line bisecting the substantially hemispherical bend.

According to an eightieth aspect of the present disclosure, a system according to any one of the sixty-third to seventy-ninth aspects is provided, wherein the bypass line is configured to preferentially remove up to about 80 wt. % of the solid fines in the gas outlet line.

According to an eighty-first aspect of the present disclosure, a system according to any one of the sixty-third to eightieth aspects is provided, wherein the fine polyolefin particles have an average diameter of less than about 200 μm.

According to an eighty-second aspect of the present disclosure, a system according to any one of the sixty-third to eighty-first aspects is provided, wherein the fine polyolefin particles have an average diameter of less than about 150 μm.

According to an eighty-third aspect of the present disclosure, a system according to any one of the sixty-third to eighty-second aspects is provided, wherein the fine polyolefin particles have an average diameter of less than about 10 μm.

According to an eighty-fourth aspect of the present disclosure, a system according to any one of the sixty-third to eighty-third aspects is provided, wherein the bypass line has an inner diameter which is from about 10% to about 40% of the inner diameter of the gas outlet line.

What is claimed is:

1. A system for reducing heat exchanger fouling rate comprising:
   a gas outlet line configured to pass a first gas stream comprising a gas and entrained fine polyolefin particles;
   a first heat exchanger configured to receive at least a portion of the first gas stream and produce a first cooled gas stream; and
   a bypass line configured to remove a portion of the entrained fine polyolefin particles from the gas outlet line to form a bypass stream comprising a higher concentration of the entrained fine polyolefin particles than is present in the first gas stream, the bypass line comprising a bypass line inlet and a bypass line outlet,
   wherein the bypass line inlet is located upstream of the first heat exchanger,
   wherein the bypass line outlet is located downstream of the first heat exchanger, and
   wherein the bypass line is configured so that the bypass stream is combined with a second gas stream at the bypass line outlet to form a combined gas stream comprising one or more olefins or paraffins, and the temperature of the combined gas stream is below the dew point of the combined gas stream.

2. The system of claim 1, wherein the first gas stream comprises one or more of unreacted olefins, nitrogen, hydrogen, and one or more paraffins.

3. The system of claim 1, wherein the system further comprises a second heat exchanger downstream of the first heat exchanger, and wherein the second heat exchanger is configured to produce a second cooled gas stream.

4. The system of claim 3, wherein the bypass line outlet is located upstream of the second heat exchanger, and wherein the second gas stream is the first cooled gas stream.

5. The system of claim 1 wherein the system further comprises a compressor configured to compress the second cooled gas stream to form a compressed gas stream.

6. The system of claim 1, wherein the bypass line outlet is located downstream of the second heat exchanger, and wherein the second gas stream is the second cooled gas stream.

7. The system of claim 6, wherein the system further comprises a compressor configured to compress the first cooled gas stream to form a compressed gas stream which is passed to the second heat exchanger.

8. The system of claim 1, wherein the system further comprises an adjustable valve at the bypass line outlet to control a flow rate of the bypass stream.

9. The system of claim 1, wherein the bypass line inlet comprises a scoop extending into the gas outlet line.

10. The system of claim 1, wherein the bypass line is configured to receive from about 5 wt. % to about 75 wt. % of the first gas stream.

11. The system of 1, wherein the gas outlet line comprises a substantially hemispherical bend.

12. The system of claim 11, wherein the bypass line is tangential to the hemispherical bend.

13. The system of claim 11, wherein the bypass line is at an angle of from about 30 degrees to about 90 degrees from a line bisecting the substantially hemispherical bend.

14. The system of claim 1, wherein the bypass line is configured to preferentially remove up to about 80 wt. % of the entrained fine polyolefin particles in the gas outlet line.

15. The system of claim 1, wherein the bypass line has an inner diameter which is from about 10% to about 40% of the inner diameter of the gas outlet line.

16. The system of claim 1, wherein the bypass line inlet has an inner diameter which is from about 5% to about 50% greater than the inner diameter of the bypass line.

17. A system for polymerizing olefins comprising:
   a polymerization reactor for contacting one or more olefins with a catalyst under polymerization conditions to form a first gas stream comprising solid fines and unreacted olefins;
   a gas outlet line configured to receive the first gas stream;
   a first heat exchanger configured to receive at least a portion of the first gas stream and produce a cooled gas stream;

a bypass line configured to remove a portion of the solid fines from the gas outlet line to form a bypass stream comprising a higher concentration of the solid fines, the bypass line comprising an inlet and an outlet, wherein the inlet is located upstream of the first heat exchanger, wherein the outlet is located downstream of the first heat exchanger, and wherein the bypass line is configured so that the bypass stream is combined with a second gas stream at the bypass line outlet to form a combined gas stream comprising one or more olefins or paraffins, and the temperature of the combined gas stream is below the dew point of the combined gas stream.

18. The system of claim 17, wherein the system further comprises a second heat exchanger downstream of the first heat exchanger, and wherein the second heat exchanger is configured to produce a second cooled gas stream.

19. The system of claim 18, wherein the bypass line outlet is located upstream of the second heat exchanger, wherein the second gas stream is the first cooled gas stream, and wherein the system optionally further comprises a compressor configured to compress the second cooled gas stream to form a compressed gas stream.

20. The system of claim 18, wherein the bypass line outlet is located downstream of the second heat exchanger, wherein the second gas stream is the second cooled gas stream, and wherein the system optionally further comprises a compressor configured to compress the first cooled gas stream to form a compressed gas stream which is passed to the second heat exchanger.

* * * * *